United States Patent [19]

Cobb

[11] 4,066,272
[45] Jan. 3, 1978

[54] DOLLY MEANS

[76] Inventor: Thomas A. Cobb, 3094 Sunrise St., Memphis, Tenn. 38127

[21] Appl. No.: 651,214

[22] Filed: Jan. 21, 1976

[51] Int. Cl.$^2$ .............................................. B62B 3/00
[52] U.S. Cl. ............................ 280/79.1 R; 280/11.28
[58] Field of Search ............ 280/32, 47.13 R, 79.1 A, 280/79.1 R, 716, 11.28; 308/95, 96, 101, 103, 105, 109, 115; 301/5.7

[56] References Cited

U.S. PATENT DOCUMENTS

| 241,746 | 5/1881 | Stephenson | 308/109 |
|---|---|---|---|
| 252,970 | 1/1882 | Price et al. | 280/11.28 |
| 876,245 | 1/1908 | Spacie | 280/11.28 |
| 973,786 | 10/1910 | Huberth | 280/11.28 X |
| 2,370,548 | 2/1945 | Kordes | 280/32 X |
| 2,415,611 | 2/1947 | Sprague | 301/5.7 X |
| 2,644,692 | 7/1953 | Kahlert | 280/11.28 X |

Primary Examiner—Joseph F. Peters, Jr.
Assistant Examiner—Michael J. Forman
Attorney, Agent, or Firm—John R. Walker, III

[57] ABSTRACT

A dolly for moving heavy loads over a supporting surface. Four axles are mounted on an elongated frame having a wood bolster for engaging the heavy load being moved. Wheels are rotatably attached to the outer ends of the axles. A resilient pad is positioned above each axle to allow each axle a degree of movement relative to the frame so that the heavy load may be moved over a slightly uneven and/or rough supporting surface without affecting the disposition of the heavy load being moved. Each wheel includes a cavity having a quantity of lubricating substance therein and is adapted to lubricate the axle it is mounted on as it rotates thereabout.

3 Claims, 5 Drawing Figures

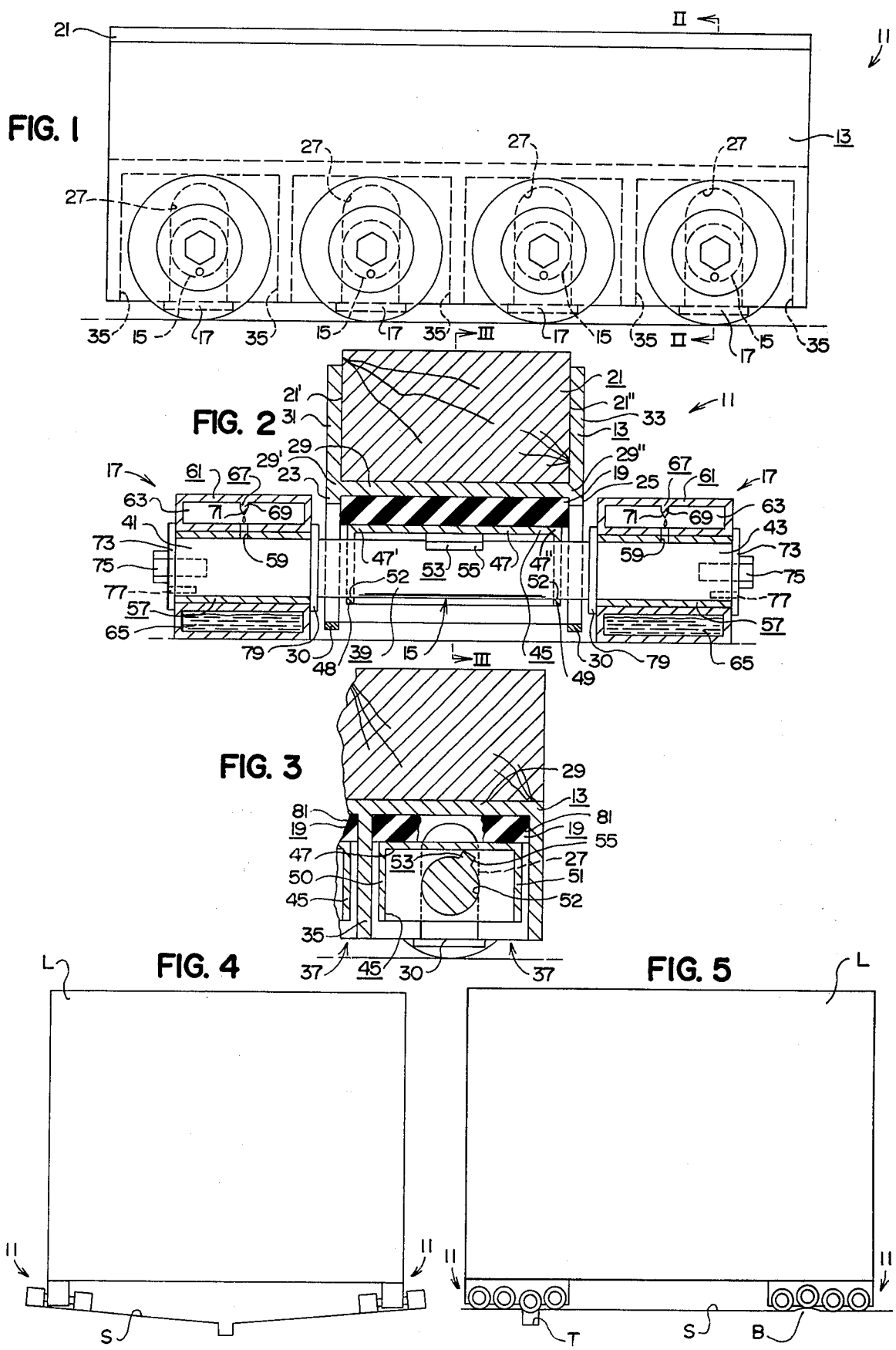

DOLLY MEANS

BACKGROUND OF THE INVENTION

1. Field of the Invention

This invention relates generally to dolly means for moving heavy loads over a supporting surface and more specifically to such dolly means for use where the supporting surface is slightly uneven and/or rough.

2. Description of the Prior Art

Heretofore, various means for moving heavy loads over supporting surfaces have been developed. See, for example, Klinker, U.S. Pat. No. 2,466,173; Rauterberg, U.S. Pat. No. 2,739,007; Castel, U.S. Pat. No. 2,855,211; and Plumly, U.S. Pat. 3,132,875. None of these patents disclose or suggest the present invention.

All the prior dolly means for moving heavy loads over supporting surfaces known by applicant are disadvantageous for one reason or another. The primary problem with such prior dolly means occurs when the heavy load is being moved over substantially uneven and/or rough surfaces. In such a situation, the concentrated weight of the load being moved will often fall on a small area of the supporting surface causing difficulties in moving the load, causing possible damage to the supporting surface, etc.

SUMMARY OF THE INVENTION

The present invention is directed towards overcoming the problems and disadvantages of prior dolly means for moving heavy loads over supporting surfaces. The concept of the present invention is to provide a dolly means in which the supporting wheels thereof are capable of movement relative to the heavy load being moved so that when the heavy load is being moved over a slightly uneven and/or rough supporting surface, the weight thereof will be substantially equally distributed through the supporting wheels.

The dolly means of the present invention includes, in general, a frame means, including an elongated bolster member for engaging the heavy load being moved, a plurality of axle means, a plurality of wheel means, and resilient means positioned between each of the axle means and the bolster means to allow each of the axle means to individually move relative to the heavy load being supported by the dolly means when the suppporting surface is slightly uneven and/or rough. The frame means includes a first leg portion depending from the first longitudinal side of the bolster member and includes a second leg portion depending from a second longitudinal side of the bolster member. Each of the first and second leg portions includes a plurality of spaced vertical slots therein. Each of the plurality of axle means extends through one of the slots in the first leg portion and one of the slots in the second leg portion. One of the plurality of wheel means is rotatably mounted on each end of each of the axle means. Each axle means preferably includes means for preventing complete rotation thereof while allowing partial rotation thereof. Each of the wheel means is preferably adapted to lubricate the portion of the axle means it is mounted on as it rotates thereabout.

BRIEF DESCRIPTION OF THE DRAWINGS

FIG. 1 is a side elevational view of the dolly means of the present invention.

FIG. 2 is a sectional view of the dolly means of the present invention as taken on line II—II of FIG. 1.

FIG. 3 is a sectional view of the dolly means of the present invention as taken on line III—III of FIG. 2.

FIG. 4 is somewhat diagrammatic end elevational view of a heavy load being moved over a supporting surface with the aid of at least two of the dolly means of the present invention.

FIG. 5 is a somewhat diagrammatic side elevational view of a heavy load being moved over a supporting surface with the aid of at least two of the dolly means of the present invention.

DESCRIPTION OF THE PREFERRED EMBODIMENT

The dolly means 11 of the present invention is for use in moving a heavy load L over a supporting surface S. In general, the dolly means 11 includes a frame means 13, a plurality of axle means 15 attached to the frame means 13, wheel means 17 rotatably mounted on each end of each of the plurality of axle means 15, and resilient means 19 for allowing each of the plurality of axle means 15 to be attached to the frame means 13 in such a manner to allow each of the axle means 15 to move relative to the frame means 13.

The frame means 13 includes an elongated bolster member 21 for engaging the heavy load L being moved. The bolster member 21 is preferably constructed of wood. The frame means 13 also includes a first leg portion 23 depending from a first longitudinal side 21' of the bolster member 21 and includes a second leg portion 25 depending from a second longitudinal side 21" of the bolster member 21. Each of the first and second leg portions 23, 25 include a plurality of spaced vertical slots 27 therein. Each leg portion 23, 25 preferably includes at least four spaced vertical slots 27. Preferably, the frame means 13 includes an elongated platelike body member 29 having a first longitudinal side 29' to which the first leg portion 23 is fixedly attached and from which the first leg portion 23 depends and having a second longitudinal side 29" to which the second leg portion 25 is fixedly attached and from which the second leg portion 25 depends. The vertical slots 27 preferably extend to the lower edge of the first and second leg portions 23, 25 and are closed by retainer bars 30 which are fixedly attached to the first and second leg portions 23, 25 adjacent the lower end of each vertical slot 27. In addition, the frame means 13 preferably includes a first arm portion 31 fixedly attached to and extending upwardly from the first longitudinal side 29' of the elongated platelike body member 29 and preferably includes a second arm portion 33 fixedly attached to and extending upwardly from the second longitudinal side 29" of the elongated platelike body member 29. The elongated bolster member 21 is preferably positioned upon the elongated platelike body member 29 between the first and second arm portions 31, 33 with the first and second arm portions 31, 33 frictionally engaging the first and second longitudinal sides 21', 21" respectively of the elongated bolster member 21 to hold the elongated bolster member 21 upon the elongated platelike body member 29. The frame means 13 also preferably includes a plurality of platelike divider members 35 fixedly attached to and depending from the elongated platelike body member 29 and extending between the first and second leg portions 23, 25 intermediate the spaced vertical slots 27 therein for coacting therewith to form a plurality of downwardly opening boxlike compartments 37. Preferably, the frame means 13 includes at least four downwardly opening boxlike compartments 37.

Each of the plurality of axle means 15 preferably includes an elongated cylindrical axle member 39 for extending through one of the spaced vertical slots 27 in the first leg portion 23 of the frame means 13 and one of the spaced vertical slots 27 in the second leg portion 25 of the frame means 13. Each of the axle members 39 includes a first end portion 41 and a second end portion 43. Each of the first and second end portions 41, 43 of each axle member 39 is adapted to extend outwardly of the first and second leg portions 23, 25 respectively of the frame means 13. Each of the plurality of axle means 15 preferably includes a saddle member 45 for being positioned in one of the plurality of downwardly opening boxlike compartments 37 of the frame means 13. The saddle member 25 includes a platelike body portion 47, a first leg portion 48 depending from a first side 47' of the body portion 47, and a second leg portion 49 depending from a second side 47" of the body portion 47. Preferably, the saddle member 45 also includes third and fourth leg portions 50, 51, respectively depending from opposite ends of the body portion 47 (see FIG. 3). The first, second, third and fourth leg portions 48, 49, 50, 51, respectively, coact with the body portion 47 to define the saddle member 45 as being a downwardly opening, box-like member. Each of the first and second leg portions 48, 49 includes a circular aperture 52 therethrough for allowing one of the axle members 39 to extend therethrough. Each of the plurality of axle means 15 includes a stop member 53 for preventing complete rotation of the axle members 39 thereof. The stop member 53 includes a blocklike projection portion 55 fixedly attached to the axle member 39 for coacting with the body portion 47 of the saddle member 45 to prevent full rotation of the axle member 39 while allowing partial rotation thereof.

Each of the wheel means 17 preferably includes a bushing member 57 rotatably mounted on one of the first or second end portions 41, 43 of an axle member 39. Each bushing member 57 preferably has a transverse aperture 59 therethrough. Each wheel means 17 preferably includes a noncollapsible tire member 61 fixedly attached to the bushing member 57 thereof. Each tire member 61 preferably has a hollow cavity 63 adjacent and communicating with the aperture 59 in the bushing member 57. Each wheel means 17 preferably includes a quantity of lubricating substance 65 such as oil or the like located within the cavity 63 of the time member 61 thereof. In addition, each wheel means 17 preferably includes a lobe member 67 fixedly attached to the tire member 61 within the cavity 63 thereof directly opposite the aperture 59 in the bushing member 57 for dropping a portion of the quantity of lubricating substance 65 into the aperture 59 in the bushing member 57 as the wheel means 17 rotates about the axle member 39 to allow drops of the quantity of lubricating substance 65 to pass through the aperture 59 in the bushing member 57 and thereby lubricate the axle member 39. The lobe member 67 preferably includes a body portion 69 for picking up and holding a portion of the quantity of lubricating substance 65 when the lobe member 67 passes therethrough. Also, the lobe member 67 preferably includes a pointed head portion 71 fixedly attached to the body portion 69 thereof for allowing drops of the quantity of lubricating substance 65 to drip from the body member 69.

It should be noted that the wheel means 17 may be mounted on the axle means 15 in a number of ways. For example, a disk-like member 73 may be fixedly attached to each end of each axle means 15 after the wheel means 17 are mounted on each end portion 41, 43 thereof to prevent the wheel means 17 from slipping off therefrom. The disk-like members 73 may be fixedly attached to the end of the axle means 15 by way of a screw 75. A dowel pin 77 may additionally be used to prevent the screw 75 from being loosened by the rotation of the wheel means 17. In addition, a washer-like member 79 may be provided on each axle means 15 between each wheel means 17 and the frame means 13.

The resilient means 19 preferably includes a plurality of resilient pad members 81 with each of the plurality of resilient pad members 81 being positioned in one of the plurality of downwardly opening boxlike compartments 37 of the frame means 13 adjacent the elongated platelike body member 29, thereof.

The use of the dolly means 11 of the present invention is quite simple. One or more of the dolly means 11 is placed beneath the heavy load L to be moved. For example, one of the dolly means 11 may be placed under each corner of the heavy load L. The heavy load L can then be easily moved over the supporting surface S even if the supporting surface S is slightly uneven and/or rough. For example, if one of the dolly means 11 being used in moving a heavy load L over a supporting surface S must pass over a portion of the supporting surface S that slopes transversely to the direction of the heavy load L is being moved (see FIG. 4), the axle means 15 of that dolly means 11 will coact with the resilient means 19 thereof to transfer a portion of the weight of the heavy load L to the supporting surface S through the wheel means 17 thereof regardless of the slope of the supporting surface and while allowing the heavy load L to remain level. Also, if one of the dolly means 11 being used in moving a heavy load L over a supporting surface S must pass over a portion of the supporting surface S which includes a bump B or the like (see FIG. 5), the axle means 15 of that dolly means 11 will coact with the resilient means 19 thereof to transfer a portion of the weight of the heavy load L to the supporting surface S through the wheel means 17 thereof regardless of the bump B or the like and while allowing the heavy load L to remain level. In addition, if one of the dolly means 11 being used in moving a heavy load L over a supporting surface S must pass over a portion of the supporting surface S which includes an open trench T or the like (see FIG. 5), the plurality of axle means 15 of that dolly means 11 will allow the dolly means 11 to pass over the trench T or the like while the weight of the heavy load L that would normally be transferred to the supporting surface S by the wheel means 17 of that dolly means 11 which are passing over the trench T or the like will be substantially transferred to the supporting surface S by the wheel means 17 of that dolly means 11 which are not over the trench T or the like.

As thus constructed and used, the present invention provides a dolly means which will allow the weight of a heavy load being moved thereby to be substantially equally distributed over the supporting surface even when the heavy load is being moved over substantially uneven and/or rough supporting surfaces.

Although the invention has been described and illustrated with respect to a preferred embodiment thereof, it is not to be so limited since changes and modifications may be made therein which are within the fully intended scope of the invention.

I claim:

1. Dolly means for use in moving heavy loads over a supporting surface, said dolly means comprising:
   a. frame means, said frame means including an elongated bolster member for engaging the heavy load being moved, said frame means including a first leg portion depending from a first longitudinal side of said bolster member, said frame means including a second leg portion depending from a second longitudinal side of said bolster member, each of said first and second leg portions including a plurality of spaced vertical slots therein, said frame means including a plurality of divider members depending from said elongated bolster member and extending between said first and second leg portions intermediate said spaced vertical slots therein for coacting therewith to form a plurality of downwardly opening compartments, each of said divider members being in the shape of a plate, each of said compartments being in the shape of a box;
   b. a plurality of axle means, each of said plurality of axle means extending through one of said slots in said first leg portion and one of said slots in said second leg portion; each of said plurality of axle means including an elongated cylindrical axle member for extending through one of said vertical slots in said first leg portion, each of said axle members including a pair of end portions for extending ourwardly of said first and second leg portion; each of said plurality of axle means including a saddle member for being positioned in one of said compartments of said frame means, said saddle member having a body portion and having a first leg portion depending from a first side of said body portion and a second leg portion depending from a second side of said body portion, each of said first and second leg portions including a circular aperture therethrough for allowing said axle member to extend therethrough, said body portion being in the shape of a plate; each of said plurality of axle means including a stop member for preventing complete rotation of said axle member, said stop member including a block portion fixedly attached to said axle member for coacting with said body portion of said saddle member to prevent full rotation of said axle member within said saddle member while allowing partial rotation thereof;
   c. a plurality of wheel means, one of said plurality of wheel means being rotatably mounted on each end of each of said plurality of axle means; and
   d. a plurality of resilient pad members, each of said resilient pad members being positioned in one of said compartments of said frame means between each of said plurality of axle means and said frame means for allowing each of said axle means a degree of movement relative to said frame means.

2. Dolly means for use in moving heavy loads over a supporting surface, said dolly means comprising:
   a. frame means, said frame means including an elongated body member, said body member being in the shape of a plate, said frame means including a first leg portion depending from substantially the entire length of a first side of said elongated body member and including a second leg portion depending from substantially the entire length of a second side of said elongated body member, each of said first and second leg portions including at least four spaced vertical slots therein, said frame means including a first arm portion extending upwardly from said first side of said elongated body member and including a second arm portion extending upwardly from said second side of said elongated body member, said frame means including an elongated bolster member for engaging the heavy load being moved, said bolster member being positioned upon said elongated body member between said first and second arm portions, said frame means including a plurality of divider members depending from said elongated body portion and extending between said first and second leg portions intermediate said spaced vertical slots therein for coacting therewith to form a plurality of downwardly opening compartments, each of said divider members being in the shape of a plate, each of said compartments being in the shape of a box;
   b. a plurality of axle means, each of said plurality of axle means including an elongated cylindrical axle member for extending through one of said vertical slots in said first leg portion and one of said vertical slots in said second leg portion, each of said axle members including a pair of end portions for extending outwardly of said first and second leg portions, each of said plurality of axle means including a saddle member for being positioned in one of said compartments of said frame means, said saddle member having a body portion and having a first leg portion depending from a first side of said body portion and a second leg portion depending from a second side of said body portion, each of said first and second leg portions including a circular aperture therethrough, each of said plurality of axle means including a stop member for preventing complete rotation of said axle member, said stop member including a projection portion fixedly attached to said axle member for coacting with said body portion of said saddle member to prevent full rotation of said axle member within said saddle member while allowing partial rotation thereof, said projection portion being in the shape of a block;
   c. a plurality of resilient pad members for allowing each of said axle means a degree of movement relative to said frame means, each of said plurality of resilient pad members being positioned in one of said plurality of compartments between said body portion of each of said saddle members of each of said axle means and said elongated body member of said frame means; and
   d. a plurality of wheel means, each of said wheel means including a bushing member for being rotatably mounted on one of said end portions of each of said axle members, each of said wheel means including a tire member fixedly attached to said bushing member thereof.

3. The dolly means of claim 2 in which said bolster member is constructed of wood.

* * * * *